United States Patent
Rajasingam et al.

(10) Patent No.: US 9,932,968 B2
(45) Date of Patent: Apr. 3, 2018

(54) WIND TURBINE BLADE WITH LIGHTNING PROTECTION

(71) Applicant: Vestas Wind Systems A/S, Aarhus N. (DK)

(72) Inventors: Damien Rajasingam, Cowes (GB); Toby Collard, Cowes (GB)

(73) Assignee: Vestas Wind Systems A/S, Aarhus N. (DK)

( * ) Notice: Subject to any disclaimer, the term of this patent is extended or adjusted under 35 U.S.C. 154(b) by 222 days.

(21) Appl. No.: 14/646,162

(22) PCT Filed: Nov. 20, 2013

(86) PCT No.: PCT/DK2013/050392
§ 371 (c)(1),
(2) Date: May 20, 2015

(87) PCT Pub. No.: WO2014/079458
PCT Pub. Date: May 30, 2014

(65) Prior Publication Data
US 2015/0308415 A1  Oct. 29, 2015

Related U.S. Application Data

(60) Provisional application No. 61/728,264, filed on Nov. 20, 2012.

(30) Foreign Application Priority Data

Nov. 20, 2012 (DK) .................................. 2012 70721

(51) Int. Cl.
*F03D 11/00* (2006.01)
*B29C 33/12* (2006.01)
(Continued)

(52) U.S. Cl.
CPC ........ *F03D 11/0033* (2013.01); *B29C 33/005* (2013.01); *B29C 33/12* (2013.01);
(Continued)

(58) Field of Classification Search
CPC ...... F03D 80/30; B29C 66/543; B29C 33/005
See application file for complete search history.

(56) References Cited

U.S. PATENT DOCUMENTS 4,449,053 A * 5/1984 Kutcher .................. F03D 13/20
290/44
4,976,587 A * 12/1990 Johnston ............... B64C 27/473
416/226

(Continued)

FOREIGN PATENT DOCUMENTS

| EP | 2320075 A2 | 5/2011 |
| WO | 2005031158 A2 | 4/2005 |
| WO | 2012019610 A1 | 2/2012 |

OTHER PUBLICATIONS

Danish Patent and Trademark Office, Search Report issued in Application No. 10403782 dated Jun. 25, 2013.
(Continued)

*Primary Examiner* — Michael N Orlando
*Assistant Examiner* — Marta S Dulko
(74) *Attorney, Agent, or Firm* — Wood Herron & Evans LLP

(57) ABSTRACT

A method of making a wind turbine blade (10) having a metallic lightning receptor (110) is described. The method comprises configuring a wind turbine blade (10) mold assembly (100) such that a clearance region (120) is defined between a mold surface (116) of at least one mold half (112, 114) and a majority of a metallic lightning receptor component (110) when the mold assembly (100) is closed, such that contact between that mold half (112, 114) and the metallic lightning receptor component (110) is substantially avoided.

(Continued)

In certain embodiments of the invention, one or both mold halves (112, 114) are truncated such that the metallic lightning receptor component (110) projects from the mold (100) when the mold (100) is closed.

11 Claims, 7 Drawing Sheets

(51) Int. Cl.
| | |
|---|---|
| *B29C 65/48* | (2006.01) |
| *B29C 65/78* | (2006.01) |
| *F03D 1/06* | (2006.01) |
| *B29C 33/00* | (2006.01) |
| *B29C 65/00* | (2006.01) |
| *F03D 80/30* | (2016.01) |
| *B29L 31/08* | (2006.01) |

(52) U.S. Cl.
CPC ............... *B29C 65/48* (2013.01); *B29C 65/78* (2013.01); *B29C 65/7802* (2013.01); *B29C 65/7841* (2013.01); *B29C 66/543* (2013.01); *B29C 66/721* (2013.01); *B29C 66/7212* (2013.01); *B29C 66/73141* (2013.01); *B29C 66/742* (2013.01); *B29C 66/81423* (2013.01); *F03D 1/0675* (2013.01); *F03D 80/30* (2016.05); *B29C 65/483* (2013.01); *B29C 66/301* (2013.01); *B29C 66/72141* (2013.01); *B29K 2995/0005* (2013.01); *B29L 2031/085* (2013.01); *F05B 2230/60* (2013.01); *Y02E 10/721* (2013.01); *Y02P 70/523* (2015.11)

(56) References Cited

U.S. PATENT DOCUMENTS

| | | | | |
|---|---|---|---|---|
| 5,800,129 | A * | 9/1998 | Lorin De La Grandmaison | B64D 45/02 416/224 |
| 6,264,877 | B1 * | 7/2001 | Pallu De La Barriere | B29C 70/446 264/258 |
| 6,457,943 | B1 * | 10/2002 | Olsen | F03D 1/0675 244/1 A |
| 6,638,466 | B1 * | 10/2003 | Abbott | B29C 33/68 264/238 |
| 6,800,956 | B2 * | 10/2004 | Bartlett | F03D 1/0675 290/44 |
| 7,494,324 | B2 * | 2/2009 | Hibbard | H02G 13/00 416/226 |
| 8,047,800 | B2 * | 11/2011 | Nies | F03D 1/0675 416/232 |
| 8,137,074 | B2 * | 3/2012 | Mendez Hernandez | F03D 1/0675 416/224 |
| 8,342,805 | B2 * | 1/2013 | Mendez Hernandez | F01D 11/00 244/1 A |
| 8,678,765 | B2 * | 3/2014 | Bendel | F03D 1/0675 29/463 |
| 8,951,034 | B2 * | 2/2015 | Christiansen | B29C 33/306 249/127 |
| 9,136,685 | B2 * | 9/2015 | Suzuki | H02G 13/00 |
| 9,371,817 | B2 * | 6/2016 | Olthoff | F03D 1/065 |
| 2006/0034971 | A1 * | 2/2006 | Olsen | B29C 33/26 425/451.5 |
| 2009/0257881 | A1 * | 10/2009 | Ostergaard Kristensen | F03D 11/0033 416/229 R |
| 2010/0047074 | A1 * | 2/2010 | Hernandez | F03D 1/0675 416/230 |
| 2011/0018282 | A1 * | 1/2011 | Hayashi | F03D 1/0608 290/55 |
| 2011/0100542 | A1 * | 5/2011 | Faulkner | B29C 33/30 156/245 |
| 2011/0103963 | A1 * | 5/2011 | Bendel | F03D 1/0675 416/229 R |
| 2011/0285056 | A1 * | 11/2011 | Davideit | B29C 33/307 264/299 |
| 2012/0211637 | A1 * | 8/2012 | Christiansen | B29C 33/306 249/102 |
| 2013/0239379 | A1 * | 9/2013 | Rajasingam | B29C 33/12 29/23.51 |
| 2013/0340252 | A1 * | 12/2013 | Garcia Castro | B29C 70/44 29/889.71 |

OTHER PUBLICATIONS

European Patent Office, International Search Report and Written Opinion issued in International Application No. PCT/DK2013/050392 dated Apr. 7, 2014.

* cited by examiner

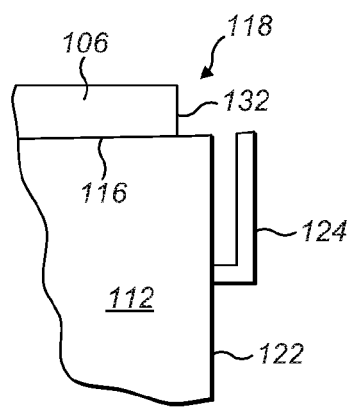
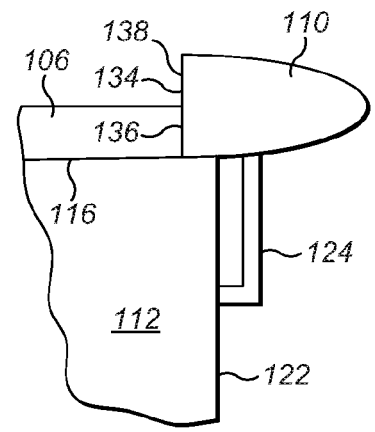
FIG. 7A    FIG. 7B
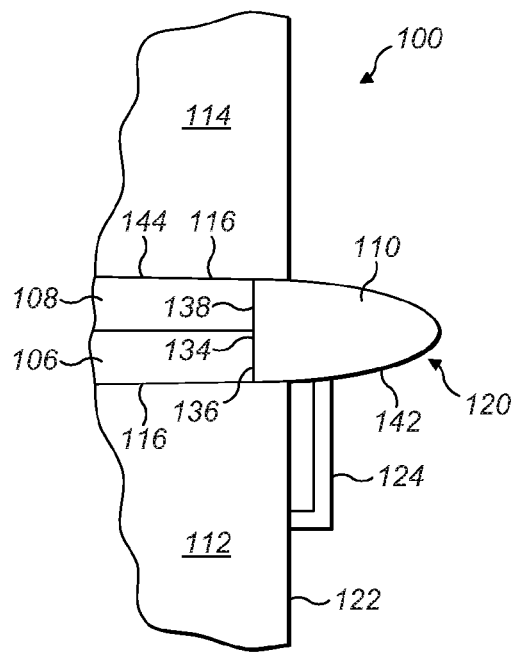
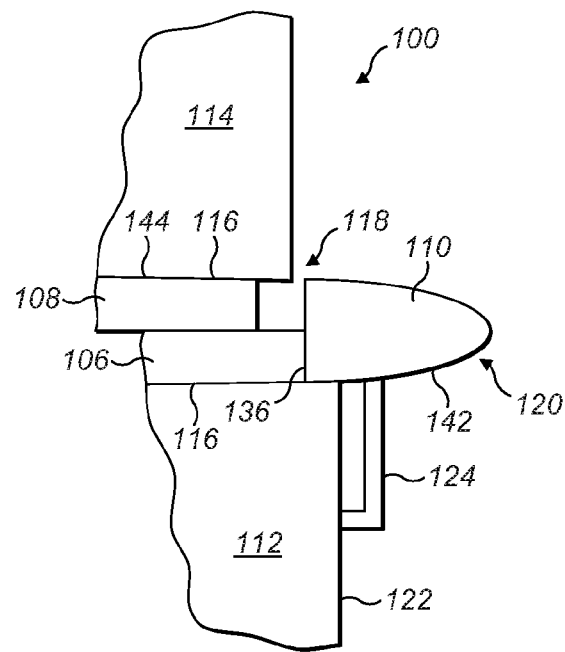
FIG. 7C    FIG. 8

US 9,932,968 B2

WIND TURBINE BLADE WITH LIGHTNING PROTECTION

TECHNICAL FIELD

The present invention relates generally to rotor blades for wind turbines and to methods of manufacturing wind turbine blades. More specifically, the present invention relates to wind turbine blades including a solid metal tip that is formed as a separate piece before being joined to the remainder of the blade.

BACKGROUND

Solid metal tips (SMTs) are typically integrated into wind turbine blades to address the problem of lightning strikes. The SMT acts as a lightning receptor that receives lightning and discharges it to a ground potential via conductors that extend inside the blade, nacelle, and tower of the wind turbine. SMTs therefore allow lightning to be discharged safely and minimise the risk of damage to the wind turbine from lightning strikes.

To put the invention into context and to explain certain problems suffered by the prior art, reference will firstly be made, by way of example, to FIGS. 1 to 3 of the accompanying drawings, in which:

FIG. 1 is a perspective view of a wind turbine blade comprising an SMT;

FIG. 2 is a partial perspective view of a tip region of a mould half that forms part of a mould assembly for making the wind turbine blade of FIG. 1;

FIGS. 3A and 3B illustrate a known method of making a wind turbine blade using the mould half of FIG. 2; and FIG. 3C illustrates the effect of an underbite misalignment of a mould assembly used in the method of FIGS. 3A and 3B.

FIG. 1 is a perspective view of a typical wind turbine rotor blade 10 that includes an SMT 12 which acts as a lightning receptor. In addition to the SMT 12, the blade 10 comprises an outer shell 14 that is fabricated from two half shells: a first half shell 16 and a second half shell 18. The half shells 16, 18 are laminated structures that are moulded from glass-fibre reinforced plastic (GRP). A lightning down conductor cable 13 is disposed within the blade 10 and is connected to the SMT 12 and carries lightning current from the tip of the blade to the root of the blade and on to ground potential The half shells 16, 18 are typically moulded in separate mould halves, such as the mould half 20 that is shown in part in FIG. 2.

To form a half shell 16, 18, its component layers are first laid up in the mould half 20. An outer skin in the form of a dry glass-fibre cloth is placed on a mould surface 22 of the mould half 20. Structural layers are then laid up on the outer skin, and an inner skin in the form of a dry glass-fibre cloth is then placed over the structural layers. The half shells 16, 18 are laid up so as to extend to a distance short of the tip 24 of the mould half 20, such that the tip region of the half shell 16, 18 is truncated to provide space for the SMT 12.

Next, the components of the half shell 16, 18 are covered with an airtight bag to form an evacuation chamber encapsulating all of the components. The chamber is evacuated, a supply of liquid resin is connected to the chamber, and resin is introduced into the mould half 20. The resin infuses between the components, and the assembly then undergoes a curing cycle to harden the resin. It will be appreciated that pre-preg composite materials may be used instead of dry materials, thereby avoiding the resin infusion step.

Referring to FIG. 3A, once each half shell 16, 18 has been moulded, the SMT 12 is arranged in place at the tip 24 of one of the two mould halves 20, and is integrated into the associated half shell 16, for example by means of an adhesive. Finally, the two half shells 16, 18 are brought together by closing the mould, as shown in FIG. 3B, and the half shells 16, 18 are bonded together to form the complete blade 10.

Although such a method provides a simple way of integrating an SMT 12 with a wind turbine blade 10, problems can arise if there is any misalignment between the two mould halves 20 when the mould is closed. If the mould halves 20 are not aligned correctly, as shown in FIG. 3C, the upper mould half 20a and the upper half shell 18 will not be positioned correctly with respect to the SMT.

For example, if the upper mould half 20a lies rearward of the lower mould half 20b, the mould exhibits a so-called 'underbite', as shown in FIG. 3C. In this event, the upper mould half 20a may clash with the SMT 12 when the mould is closed. In extreme cases, this can damage the SMT 12, or even lead to the SMT 12 breaking away from the lower half shell 16.

Even if the SMT 12 is not damaged, the clashing can prevent the upper mould half 20a from being lowered in to position correctly, leaving an unacceptable gap 26 between the upper and lower half shells 16, 18 and a further gap 28 between the upper half shell 18 and the SMT 12. This is particularly problematic, as the gap 26 between the upper and lower half shells 16, 18 leads to insufficient contact occurring between the half shells 16, 18, which may ultimately compromise the bond strength between the shells 16, 18 and the structural integrity of the blade 10.

Such clashing can also cause damage to the mould itself. For example, the smooth inner surface of the mould may be damaged, which can be problematic for future use of the mould.

A misalignment of only a few millimeters is sufficient to cause the clashing described above. Modern wind turbine blades may be over eighty meters in length, and it will be appreciated that when manufacturing blades of this size, misalignments are difficult to avoid. In particular, it is difficult to achieve precise alignment simultaneously at both the blade root and at the blade tip. Thus, for manufacturing processes where alignment at the root is crucial, alignment of the half shells at the tip is particularly difficult, and the above problem is particularly prevalent.

It is an object of the invention to mitigate or overcome this problem.

SUMMARY OF THE INVENTION

Against this background, a first aspect of the invention resides in a method of making a wind turbine blade, the method comprising: providing a mould assembly having first and second mould halves, each mould half comprising a mould surface, the mould assembly having an open position in which the mould halves are spaced apart, and a closed position in which the mould halves are brought together; making a first half shell of the wind turbine blade in the first mould half and making a second half shell of the wind turbine blade in the second mould half when the mould assembly is in the open position, each half shell comprising a composite material; integrating a metallic lightning receptor component with the first half shell; configuring the mould assembly such that a clearance region is defined between the mould surface of the second mould half and the metallic lightning receptor component when the mould assembly is in the closed position, such that contact between the second mould half and the metallic lightning receptor component is substantially avoided; closing the mould assembly; and joining the first and second half shells together.

The invention provides a method of making a wind turbine blade in which contact between the mould surface of the second mould half and the metallic lightning receptor component is substantially avoided. In this way, the risk of the second mould half clashing with the metallic lightning receptor component in the event of a misalignment of the mould halves is significantly reduced or avoided. This in turn reduces the risk of damage to the metallic lightning receptor component, and reduces the risk of insufficient contact being made between the half shells.

To prevent movement of the metallic lightning receptor component as the steps of the method are carried out, the method may further comprise holding the metallic lightning receptor component in place with respect to the first half shell during closing of the mould assembly. Preferably, the metallic lightning receptor component is held in place with a support in the form of a jig.

Preferably, the method further comprises configuring the mould assembly such that the clearance region is also defined between the mould surface of the first mould half and the metallic lightning receptor component when the mould assembly is in the closed position.

To provide the clearance region, an end region of the second mould half may be truncated, such that the metallic lightning receptor component projects from the truncated end region of the second mould half when the mould assembly is in the closed position.

The end region of the first mould half may be truncated, such that the metallic lightning receptor component projects from the truncated end region of the first mould half when the mould assembly is in the closed position.

Preferably, the step of integrating the metallic lightning receptor with the first half shell comprises bonding the metallic lightning receptor component to the first half shell.

To avoid movement of the metallic lightning receptor component after it has been integrated with the first half shell, the step of closing the mould assembly may comprise moving the second mould half relative to the first mould half. Preferably, the step of closing the mould assembly comprises arranging the second mould half on top of the first mould half.

In one embodiment, the step of making the first half shell involves a curing process, and the step of integrating the metallic lightning receptor component with the first half shell occurs after the curing process. This allows the first half shell to be fully formed prior to integration of the metallic lightning receptor component.

In one embodiment, the metallic lightning receptor component may be a metal blade tip itself. In an alternative embodiment, a metal blade tip is connected to the metallic lightning receptor component. In this embodiment, the blade tip which acts as the lightning receptor is assembled onto the metallic lightning receptor component. The clearance region defined between the mould surface of the second mould half and the metal blade tip may be over a a majority of the metal blade tip when the mould assembly is in the closed position.

So as to provide for onward adaptability of the mould assembly, one or both of the first and second mould halves may comprise a removable tip portion, and the method may comprise truncating the or each mould half by removing the or each tip portion prior to closing the mould assembly.

From a second aspect, the invention resides in a mould assembly for a wind turbine blade, the mould assembly comprising a first mould half for moulding a first half shell of the wind turbine blade and a second mould half for moulding a second half shell of the wind turbine blade, each half shell comprising a composite material, the mould assembly having an open position in which the mould halves are spaced apart, and each mould half comprising a mould surface and a closed position in which the mould halves are brought together, wherein, in use, a metallic lightning receptor component is integrated with the first half shell and the mould assembly is configured such that a clearance region is defined between the mould surface of the second mould half and the metallic lightning receptor component when the mould assembly is in the closed position, such that contact between the mould surface of the second mould half and the metallic lightning receptor component is substantially avoided.

The invention provides a mould assembly in which contact between the mould surface of the metallic lightning receptor component and the second mould half is substantially avoided as a result of the clearance region. The risk of the second mould half clashing with the metallic lightning receptor component in the event of a misalignment of the mould halves is therefore reduced. This in turn reduces the risk of damage to the metallic lightning receptor component, and reduces the risk of insufficient contact between the half shells.

In one embodiment of the invention, an end region of the second mould half is truncated, such that the metallic lightning receptor component projects from the truncated end region of the second mould half when the mould is in the closed position.

In an alternative embodiment of the invention, a portion of the mould surface located at an end region of the second mould half is spaced apart from the metallic lightning receptor component when the mould is in the closed position to define at least a portion of the clearance region.

To reduce movement of the metallic lightning receptor component as the wind turbine blade is made, the mould assembly preferably comprises a support to hold the metallic lightning receptor component in place with respect to the first half shell during closing of the mould assembly. The support acts a jig for the metallic lightning receptor component.

The clearance region may also be defined between the first mould half and the metallic lightning receptor component when the mould is in the closed position, such that contact between both mould halves and the metallic lightning receptor component is substantially avoided. In this case, an end region of the first mould half may be truncated, such that the metallic lightning receptor component projects from the truncated end region of the first mould half when the mould assembly is in the closed position. Alternatively, a portion of the mould surface located at an end region of the first mould half may be spaced apart from the metallic lightning receptor component when the mould assembly is in the closed position to define at least a portion of the clearance region.

In any embodiment, the clearance region may be at least partially filled with a compressible material.

To allow for ongoing adaptability of the mould assembly, one or both of the first and second mould halves may comprise a tip portion that is removable to define the clearance region.

The invention also extends to a wind turbine blade comprising first and second half shells and a metal blade tip integrated with the first and second half shells, the wind turbine blade being made according to any method described above and/or being made using any mould assembly described above.

BRIEF DESCRIPTION OF THE DRAWINGS

FIGS. 1, 2, and 3A to 3C have already been described above by way of background to the present invention. In order that the invention may be more readily understood, specific embodiments of the invention will now be described, by way of example only, with reference to the following drawings, in which:

FIGS. 7A to 7C illustrate a series of steps of a method of making a wind turbine blade in accordance with an embodiment of the present invention;

FIG. 8 is a partial cross-sectional view of the mould assembly of FIG. 4 with the mould halves misaligned.

DETAILED DESCRIPTION

Figure 1:
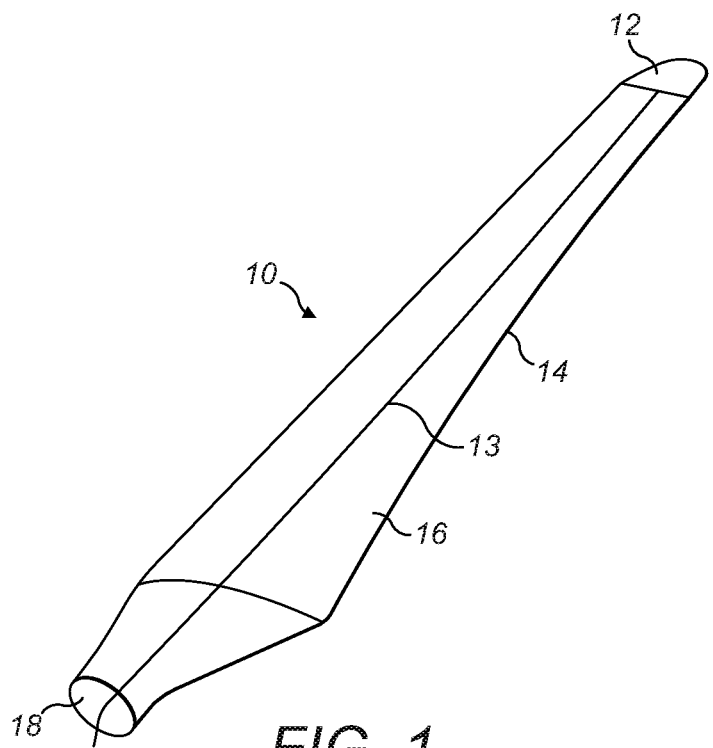
Figure 2:
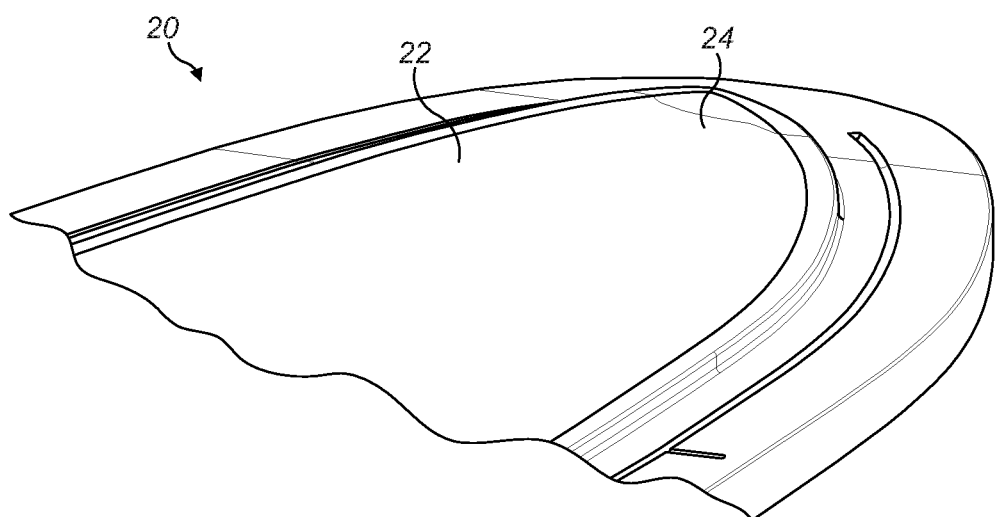
Figure 3A:
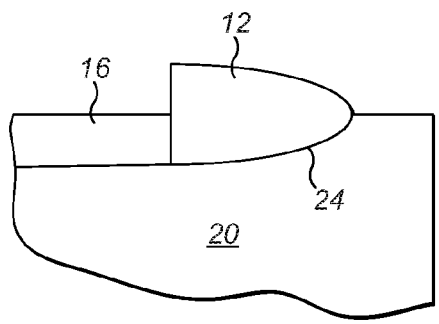
Figure 3B:
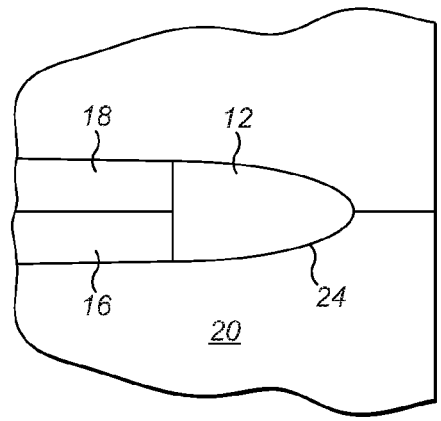
Figure 3C:
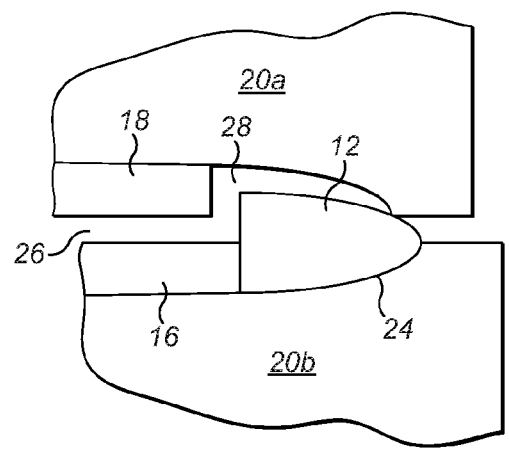
Figure 4:
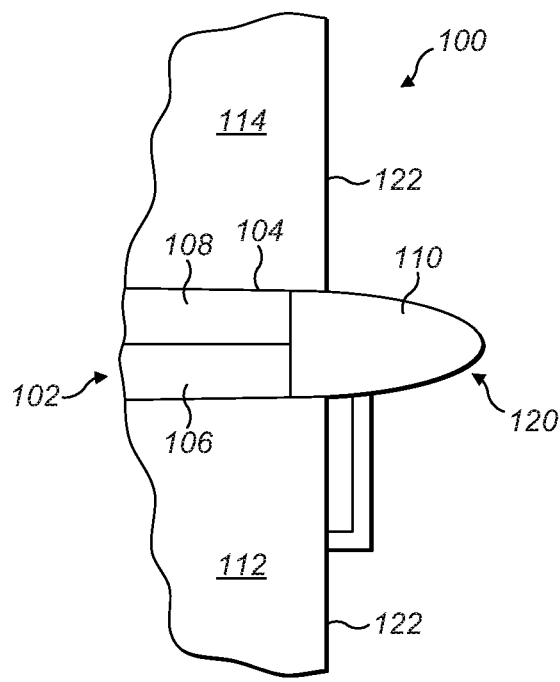
FIG. 4 is a partial cross-sectional view of a wind turbine blade having a solid metal tip and being supported by a truncated mould assembly according to a first embodiment of the invention, the mould assembly being arranged in a closed position.

FIG. 4 shows a cross-sectional view of a mould assembly 100 according to an embodiment of the invention. Specifically, the mould assembly 100 is for moulding a wind turbine blade 102 that comprises an outer shell 104 formed from two half shells 106, 108, and a lightning receptor in the form of a solid metal tip (SMT) 110 integrated with the outer shell 104. Each half shell 106, 108 of the outer shell 104 is moulded from glass-fibre reinforced plastic (GRP).

The mould assembly 100 comprises two mould halves: a first mould half 112 for moulding the first half shell 106, and a second mould half 114 for moulding the second half shell 108. The mould assembly 100 has an open position in which the two mould halves 112, 114 are spaced apart, and a closed position in which the two mould halves 112, 114 are brought together, as shown in FIG. 4. Each mould half 112, 114 extends along a longitudinal axis and comprises an inner mould surface 116 (FIG. 5) for moulding its respective half shell 106, 108. The mould surface 116 is substantially smooth and has a generally concave curvature. Each mould half 112, 114 extends along its longitudinal axis from a root end of the mould half 112, 114 towards a truncated tip end 118 of the mould half 112, 114.

To make a wind turbine blade 102, each half shell 106, 108 is made in its respective mould half 112, 114 with the mould assembly 100 in its open position, as will be later described. Once the half shells 106, 108 have been cured to harden the resin, the SMT 110 is integrated with the first half shell 106. The mould assembly 100 is then moved into the closed position, the half shells 106, 108 are bonded together, and the SMT 110 is bonded to the second half shell 108.

In the open position, the mould halves 112, 114 are arranged next to one another, with their longitudinal axes aligned and respective mould surfaces 116 facing upwards. To move the mould assembly 100 into the closed position, one of the mould halves 112, 114 is lifted and pivoted into place above the other, for example, by means of hydraulic pistons. In the example described above, where the SMT 110 is integrated with the first half shell 106, the second mould half 114 is typically pivoted into place above the first mould half 112, such that in the closed position the second mould half 114 is arranged above the first mould half 112, with its mould surface 116 facing downwards.

Figure 5:
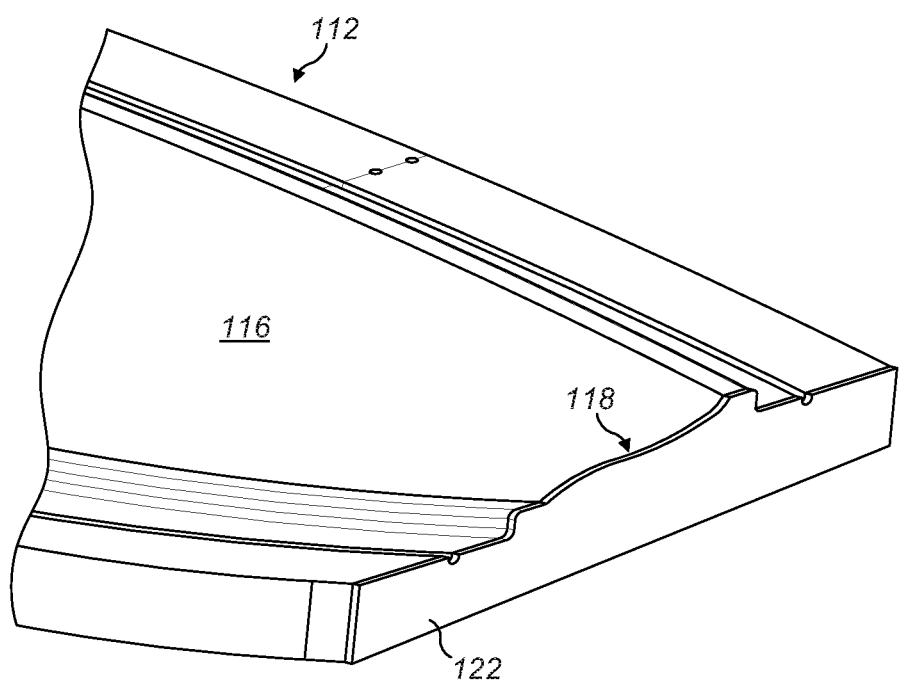
FIG. 5 is a partial perspective view of a truncated tip region of a first mould half of the mould assembly of FIG. 4.

As mentioned briefly above, each mould half 112, 114 has a truncated tip end 118 (FIG. 5). When the mould assembly 100 is in use and in the closed position, the SMT 110 protrudes from this truncated tip end 118, as shown in FIG. 6B. Accordingly, the SMT 110 projects clear of the mould surfaces 116 of the first and second mould halves 112, 114, or in other words a clearance region 120 is defined between the SMT 110 and the respective mould surfaces 116, such that contact between the first and second mould halves 112, 114 and the SMT 110 is substantially avoided. This clearance region 120 is particularly significant in the event that there is a misalignment of the mould halves 112, 114, as will be described later.

The truncation of the tip end 118 of each mould half 112, 114 also provides a substantially flat end surface 122 of the mould half. A support 124 is mounted to the flat end surface 122 of the first mould half 112. The support 124 holds the SMT 110 in place during bonding of the SMT 110 to the first half shell 106, and subsequently during closing of the mould assembly 100, and joining of the half shells 106, 108. In the embodiment shown, the support 124 is in the form of a wedge having a vertical surface 126 that abuts the flat end surface 122 of the mould half 112, a supporting surface 128 that is substantially horizontal when the mould assembly 100 is in use, and a sloping surface 130 that extends between the vertical surface 126 and the supporting surface 128. In use, the supporting surface 128 supports the SMT 110. In other words, the support 124 acts as a jig for the SMT 110.

To manufacture a wind turbine blade 102 using the mould assembly 100, the second and first shells 106, 108 are first moulded in the respective first and second mould halves 112, 114. Each half shell 106, 108 is laid up by arranging the various laminate layers of the half shells in the respective mould halves 112, 114, as will now be described.

An outer skin in the form of a dry fibre material is first placed on the inner mould surface 116. A layer of structural foam is introduced into the mould half 112, 114, and an inner skin in the form of a dry fibre material is placed on the upper surface of the structural foam.

Further components such as spar caps may also be incorporated into the shell, between the outer and inner skins. The various layers and components of the half shell 106, 108 extend up to the truncated tip end 118 of the mould half 112, 114, or stop shortly before the truncated tip end 118, such that the half shell 106, 108 is truncated in the same manner as the mould half 112, 114.

The components are covered with an airtight bag to form an evacuation chamber that encapsulates all of the components. The chamber is then evacuated using a vacuum pump. With the pump still energised, a supply of liquid resin is connected to the chamber, and resin flows into the chamber through a plurality of resin inlets, which are longitudinally spaced along the mould half 112, 114. Resin infuses throughout the half shell 106, 108 in a generally chordwise direction, between the components in the half shell 106, 108.

The pump continues to operate during a subsequent moulding operation in which the mould assembly 100 is heated so as to cure the resin, although during the curing process the vacuum pressure may be adjusted. The bags are then removed from the moulded half shells 106, 108.

Because the components of each half shell 106, 108 are laid up to extend only as far as, or just short of, the truncated tip end 118 of the mould half 112, 114, each half shell 106, 108 is truncated in the same manner as the mould half 112, 114. The truncation of each half shell 106, 108 defines a substantially flat end surface 132 of the half shell 106, 108, as best shown in FIG. 7A, which receives the SMT 110.

In the next step of the method, illustrated in FIG. 7B, an SMT 110 is integrated with the first half shell 106.

The SMT 110 is made from copper, and is able to receive and conduct lightning, as previously described. The SMT 110 comprises a flat base 134, and a first half 136 of the flat base 134 abuts the flat end surface 132 of the first half shell 106. A second half 138 of the flat base 134 protrudes above the first half shell 106, to abut the flat end surface 132 of the second half shell 108 during subsequent stages of the process.

Figure 6A:
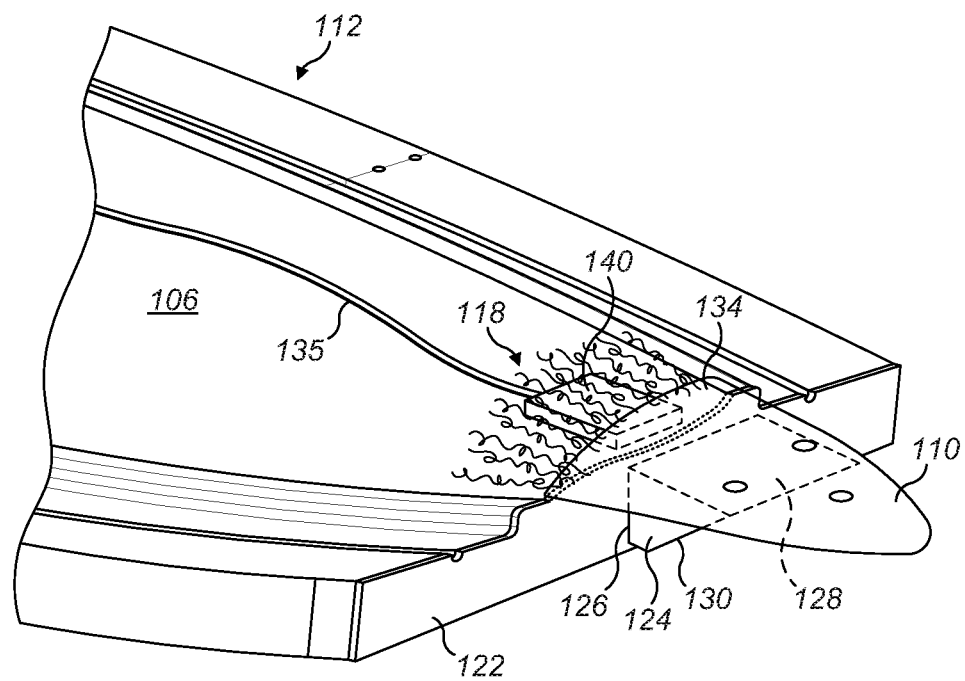
FIG. 6A is a partial perspective view of the first mould half of the mould assembly of FIG. 4 when the mould assembly is in an open position, and before the turbine blade is fully formed, showing a first half shell of the blade arranged in the mould half and the solid metal tip integrated with the first half shell.
Figure 6B:
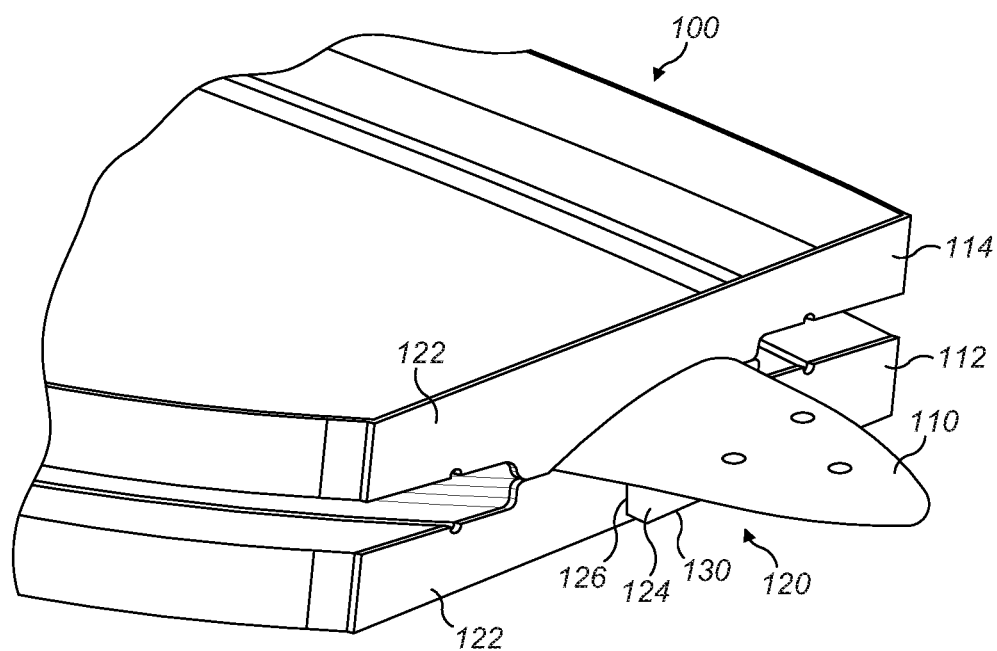
FIG. 6B is a partial perspective view of the mould assembly of FIG. 4 when the mould assembly is in the closed position.

A tongue 140 extends outwardly from the flat base 134 of the SMT 110 and into the first half shell 106, as shown in FIG. 6A. The tongue 140 may be coated with an insulating material prior to integration of the SMT 110 with the half shell 106, and the insulating material may be bonded to the first half shell 106, so as to secure the SMT 110 to the first half shell 106. FIG. 6A also shows a lightning down conductor 135 connecting the tongue 140 to ground potential. In the event of lightning hitting the SMT 110, which functions as a lightning receptor, the lightning current will flow through the SMT 110, the tongue 140 and the down conductor 135 to ground.

During insertion of the SMT 110 into the first half shell 106, and during the subsequent forming process, the SMT 110 is held in place by the support 124. In this way, the SMT 110 is fixed in place, and movement of the SMT 110 is minimised. This helps to ensure a close fit between the half shells 106, 108 and the SMT 110, and therefore results in effective bonding between the SMT 110 and the outer shell 104 of the wind turbine blade 102. Holding the SMT 110 in place also helps to ensure that the outer shell 104 and the SMT 110 provide the correct blade profile and geometry.

In the next step of the method, shear webs are attached to the inner skin of the first half shell 106, and the upper free ends of the webs are coated with respective layers of adhesive.

As best shown in FIG. 7C, the second mould half 114 is then lifted and pivoted into position above the first mould half 112, such that the second mould half 114 is upturned and placed on top of the first mould half 112. The truncation of the second half shell 108 allows it to accommodate the SMT 110 that is arranged at the end of the first half shell 106. When the mould assembly 100 is closed, the flat end surface 132 of the second half shell 108 faces the second half 138 of the base 134 of the SMT 110. If the mould halves 112, 114 are accurately aligned, the flat end surface 132 of the second half shell 108 abuts the base 134 of the SMT 110. The SMT 110 is then fully integrated into the blade 102, such that an outer surface 142 of the SMT 110 is contiguous with the outer surfaces 144 of the first and second half shells 106, 108.

Closing the mould assembly 100 also causes the inner skin of the second half shell 108 to adhere to the upper free ends of the shear webs, as is known in the art. The resilient nature of the webs gives rise to a biasing force of the webs against the second half shell 108, so as to ensure good adhesion.

As previously described, and as shown particularly in FIGS. 6B and 7C, the first and second mould halves 112, 114 are truncated. In this way, when the mould assembly 100 is in the closed position, the SMT 110 projects from the tip ends 118 of the mould halves 112, 114 and a clearance region 120 is defined between the mould surfaces 116 of the first and second mould halves 112, 114 and a majority of the SMT 110; i.e. contact between the respective mould surfaces 116 and the SMT 110 is substantially avoided.

FIG. 8 illustrates a mould assembly 100 according to the invention that has a misalignment between the first and second mould halves 112, 114. Specifically, the second mould half 114 lies rearward of the first mould half 112 to define an 'underbite'. The truncated tip end 118 of the second mould half 114 ensures that contact between the mould surface 116 of the second mould half 114 and the SMT 110 is substantially avoided even in cases of misalignment.

Thus, when using a mould assembly 100 or method according to the invention, a misalignment of the mould halves 112, 114 at the tip end 118 does not result in unacceptable clashing of the second mould half 114 with the SMT 110. Risk of damage to the SMT 110 as the mould assembly 100 is closed is therefore substantially avoided. Furthermore, the second half shell 108 can be properly lowered onto the first half shell 106 despite any misalignment, so that effective contact can still be made between the half shells 106, 108, and the required pressure can be applied during bonding.

In the final step of the method, the mould assembly 100 is opened and the finished wind turbine blade 102 is lifted from the mould assembly 100. The resulting wind turbine blade 102 is then incorporated into a wind turbine by known methods.

Figure 9A:
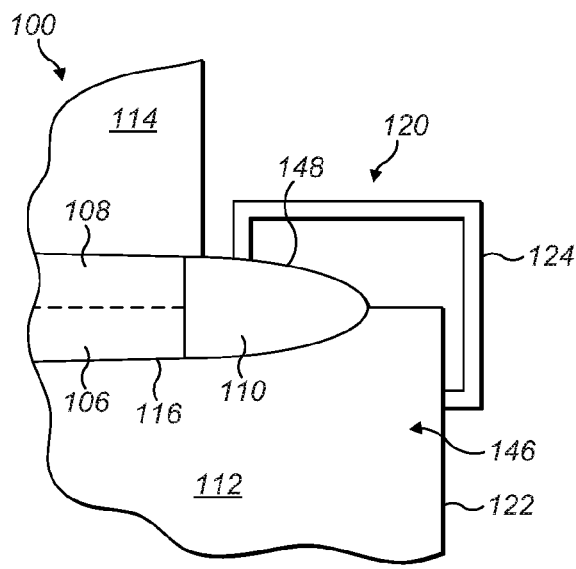
FIGS. 9A to 9C are partial cross-sectional views of alternative embodiments of a mould assembly according to the invention.
Figure 9B:
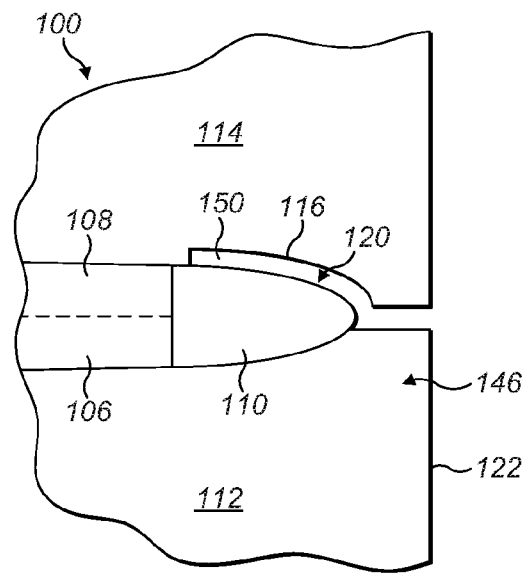
Figure 9C:
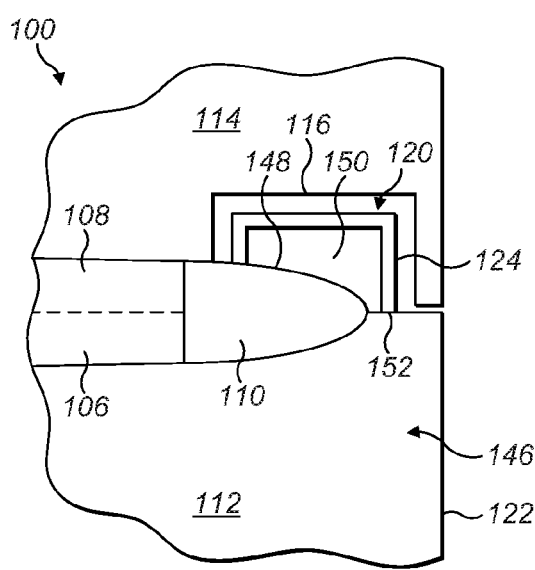

FIGS. 9A, 9B, and 9C show alternative embodiments of the invention in which the clearance region 120 is defined only between the second mould half 114 and the SMT 110. FIG. 9A illustrates an embodiment in which only the second mould half 114 is truncated, while the first mould half 112 is a complete (i.e. non-truncated) mould half that comprises a tip portion 146 at the tip end 118. In this embodiment a support 124 extends from a flat end surface 122 of the tip end 118 of the first mould half 112 to meet an upper surface 148 of the SMT 110, and holds the SMT 110 in place.

FIGS. 9B and 9C illustrate embodiments in which the second mould half 114 is not truncated. Instead, the mould surface 116 of the second mould half 114 is shaped to define a cavity 150 adjacent the SMT 110 when the mould assembly 100 is closed. The cavity 150 defines the clearance region 120 between the mould surface 116 and the SMT 110 to avoid contact between the SMT 110 and the mould surface 116 of the second mould half 114 when the mould is closed.

In the embodiment shown in FIG. 9C, a support 124 extends from an upper surface 152 of a tip end 146 of the first mould half 112 to an upper surface 148 of the SMT 110, and the support 124 holds the SMT 110 in place. The support 124 extends into the cavity 150 defined between the mould surface 116 of the second mould half 114 and the SMT 110. The mould surface 116 at the tip end 146 of the second mould half 114 is therefore shaped to accommodate the support 124, so as to avoid clashing between the second mould half 114 and the support 124.

Figure 10A:
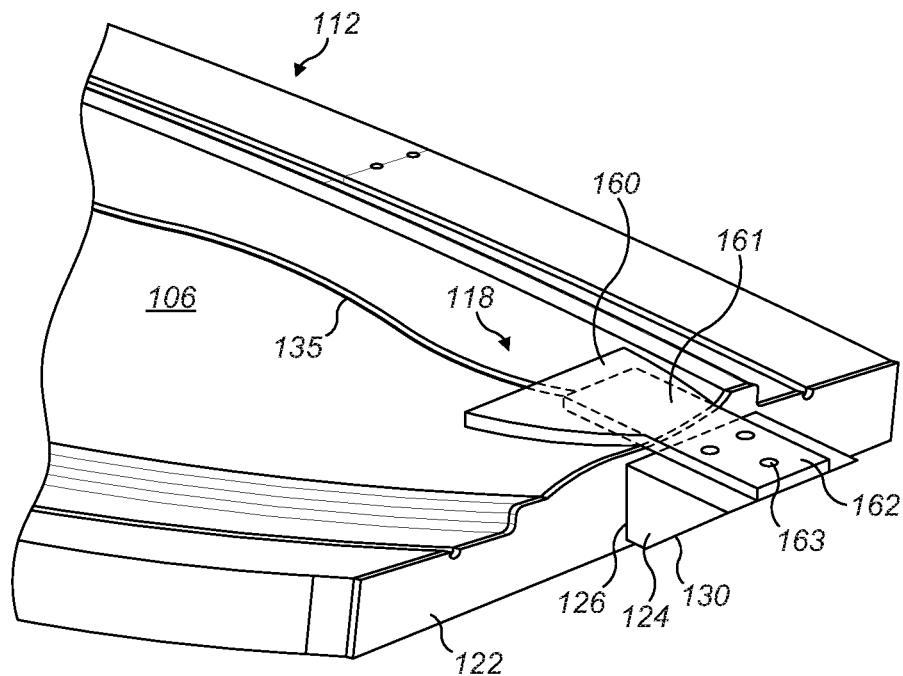
FIG. 10A is a partial perspective view of the first mould half of the mould assembly in an open position, and before the turbine blade is fully formed, showing a first half shell of the blade arranged in the mould half.
Figure 10B:
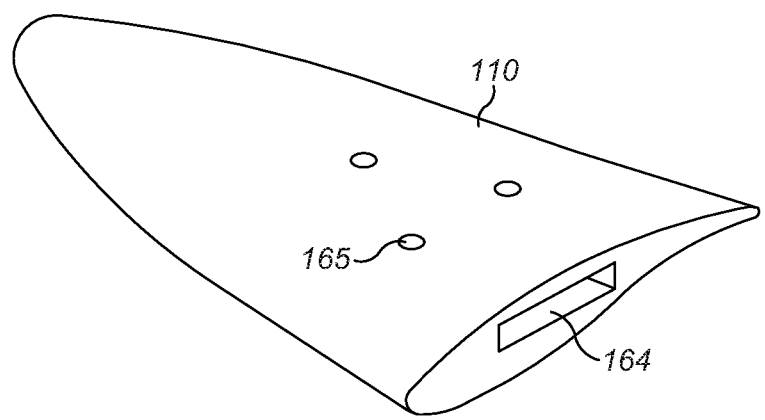
FIG. 10B is a perspective view of a solid metal tip.

In a further embodiment as shown in FIGS. 10A and 10B, the SMT is not actually integrated with the mould halves 112, 114 when they are closed. Instead, the tip assembly has a modular construction and the SMT is connected to the blade after the blade shells have been bonded together. In this embodiment, an implant 160 which comprises an insulating plastic material such as polyurethane has a metallic lightning receptor component embedded within it. In this example, the metallic lightning receptor component is in the form of a metal plate 161. The metal plate 161 has a free end 162 which projects from the tip end of the implant 160. The implant 160 is positioned on the half shell 106 such that the free end of the plate 162 protrudes from the truncated tip end of the mould half 112. The implant 160 and plate 161 are maintained in position by the support 124 and located through holes 163 which are aligned with holes in support 124 so that the support acts as a jig. Bolts or similar are inserted through holes 163 so that the plate 161 is aligned with the support 124.

The half shell 106 has already been cured and in this embodiment the implant 160 is bonded to the half shell 106 though adhesive, such as epoxy adhesive. The support 124 ensures accurate alignment of the implant 160 and the plate 161 in all three directions. The second mould half 114 is then lifted and pivoted into position on top of the first mould half 112—adhesive placed on top of the implant 160 ensures that the implant is also bonded to the second half shell 108. Subsequently, the SMT 110 (which is shown in FIG. 10B) can be connected to the free end of the plate 162. As seen in FIG. 10B, the SMT has a recess 164 into which the free end of the plate 162 is received. The SMT can then be mechanically connected via bolts through holes 165 which are aligned with holes 163 in the free end of the plate 163.

In this embodiment with a modular tip, the mould constructions shown in FIGS. 9A to 9C can also be implemented.

Embodiments are also envisaged in which one or both mould halves comprises a removable end portion, which may be removable from the mould half to provide the truncation of the mould half or the cavity between the mould surface and the SMT, and thereby to define the clearance region. Such a removable end portion would allow for ongoing adaptability of the mould assembly. In other embodiments, the clearance region may be filled by a compressible material which is elastically deformable so as to accommodate any clashing between the mould half and the blade tip whilst cushioning the SMT, i.e. minimising any force exerted on the SMT when the mould is closed.

Although in the embodiments described the support is attached to the first mould half, it will be appreciated that this need not be the case, and the support may instead be provided as a free-standing component.

Many other modifications may be made to the embodiments described above without departing from the scope of the invention as defined in the following claims.

The invention claimed is:

1. A method of making a wind turbine blade, the method comprising:
   providing a mould assembly having first and second mould halves, each mould half comprising a mould surface, the mould assembly having an open position in which the mould halves are spaced apart, and a closed position in which the mould halves are brought together;
   making a first half shell of the wind turbine blade in the first mould half and making a second half shell of the wind turbine blade in the second mould half when the mould assembly is in the open position, each half shell comprising a composite material;
   integrating a metallic lightning receptor component with the first half shell such that when the mould assembly is in the open position, the entirety of the metallic lightning receptor component is provided to the first mould half and none of the metallic lightning receptor component is provided to the second mould half;
   configuring the mould assembly such that a clearance region is defined between the mould surface of the second mould half and the metallic lightning receptor component when the mould assembly is in the closed position, such that contact between the second mould half and the metallic lightning receptor component is substantially avoided;
   closing the mould assembly; and
   joining the first and second half shells together.

2. The method of claim 1, further comprising holding the metallic lightning receptor component in place with respect to the first half shell during closing of the mould assembly.

3. The method of claim 1, further comprising configuring the mould assembly such that the clearance region is also defined between the mould surface of the first mould half and the metallic lightning receptor component when the mould assembly is in the closed position.

4. The method of claim 1, wherein an end region of the second mould half is truncated, such that the metallic lightning receptor component projects from the truncated end region of the second mould half when the mould assembly is in the closed position.

5. The method of claim 1, wherein an end region of the first mould half is truncated, such that the metallic lightning receptor component projects from the truncated end region of the first mould half when the mould assembly is in the closed position.

6. The method of claim 1, wherein the step of integrating the metallic lightning receptor component with the first half shell comprises bonding the metallic lightning receptor component to the first half shell.

7. The method of any preceding claim 1, wherein the step of making the first half shell involves a curing process, and the step of integrating the metallic lightning receptor component with the first half shell occurs after the curing process.

8. The method of claim 1, wherein the metallic lightning receptor component is a metal blade tip.

9. The method of any of claim 1, wherein a metal blade tip is connected to the metallic lightning receptor component.

10. The method of claim 1, wherein one or both of the first and second mould halves comprises a removable tip portion, and the method comprises removing a corresponding tip portion from at least one of the first and second mold halves prior to closing the mould assembly.

11. The method of claim 1, wherein the first and second shell halves each include a leading edge portion and a trailing edge portion, and wherein joining the first and second half shells together further includes joining the leading and trailing edge portions of the first and second shell halves to form the leading and trailing edges of the wind turbine blade.

\* \* \* \* \*